US011276320B2

(12) United States Patent
O'Sullivan

(10) Patent No.: US 11,276,320 B2
(45) Date of Patent: *Mar. 15, 2022

(54) METHOD FOR EDUCATING USERS BY GAMIFICATION

(71) Applicant: GMST (Ireland) LTD, Dublin (IE)

(72) Inventor: Kieran O'Sullivan, Dublin (IE)

(73) Assignee: GMST (Ireland) LTD, Dublin (IE)

( * ) Notice: Subject to any disclaimer, the term of this patent is extended or adjusted under 35 U.S.C. 154(b) by 312 days.

This patent is subject to a terminal disclaimer.

(21) Appl. No.: 16/078,540

(22) PCT Filed: Feb. 23, 2017

(86) PCT No.: PCT/EP2017/054127
§ 371 (c)(1),
(2) Date: Aug. 21, 2018

(87) PCT Pub. No.: WO2017/144566
PCT Pub. Date: Aug. 31, 2017

(65) Prior Publication Data
US 2019/0051203 A1    Feb. 14, 2019

(51) Int. Cl.
*G09B 7/02* (2006.01)
*G09B 5/00* (2006.01)

(52) U.S. Cl.
CPC ........ *G09B 7/02* (2013.01); *G09B 5/00* (2013.01)

(58) Field of Classification Search
CPC .............. G09B 7/02; G09B 5/00; A63F 13/79
USPC ........................................................ 434/362
See application file for complete search history.

(56) References Cited

U.S. PATENT DOCUMENTS

| 5,035,625 | A | * | 7/1991 | Munson ............ G09B 7/00 434/327 |
| 6,487,390 | B1 | * | 11/2002 | Virine ............. G09F 27/00 455/3.01 |
| 6,636,247 | B1 | * | 10/2003 | Hamzy ........... G06Q 30/02 705/14.73 |
| 8,775,332 | B1 | | 7/2014 | Morris et al. |
| 2003/0078833 | A1 | * | 4/2003 | Suzuki ......... G06Q 10/06398 705/7.42 |
| 2003/0157928 | A1 | * | 8/2003 | Phillips ........... H04L 67/04 455/414.1 |

(Continued)

FOREIGN PATENT DOCUMENTS

WO    2004102431    11/2004

OTHER PUBLICATIONS

Dominik Kirchler, Patent Cooperation Treaty International Search Report, PCT/EP2017/054127, dated Apr. 19, 2017, 3 pages, European Patent Office, Netherlands.

Primary Examiner — Robert P Bullington
Assistant Examiner — Stephen Alvesteffer
(74) Attorney, Agent, or Firm — Stetina Brunda Garred & Brucker

(57) ABSTRACT

A method for educating users by gamification performed by at least one apparatus, is inter alia disclosed, said method comprising: repeatedly generating data pertaining to a user interface element; and providing said data pertaining to said user interface element, said user interface element allowing a user using a first software section or a user interface thereof upon activation of said user interface element to access a second software section or a user interface thereof for educating users by gamification.

30 Claims, 8 Drawing Sheets

(56) References Cited

U.S. PATENT DOCUMENTS

| | | | |
|---|---|---|---|
| 2004/0068536 A1* | 4/2004 | Demers | G06F 16/957 |
| | | | 709/201 |
| 2005/0165645 A1* | 7/2005 | Kirwin | G06Q 30/02 |
| | | | 705/14.2 |
| 2006/0089194 A1* | 4/2006 | Joshi | G07F 17/3255 |
| | | | 463/25 |
| 2009/0063308 A1* | 3/2009 | Cumming | G06Q 30/0283 |
| | | | 705/28 |
| 2013/0079128 A1 | 3/2013 | Thomas et al. | |
| 2013/0080242 A1* | 3/2013 | Alhadeff | G06Q 30/0239 |
| | | | 705/14.39 |
| 2014/0244785 A1* | 8/2014 | Potlapally | H04L 9/0869 |
| | | | 709/217 |
| 2014/0274413 A1 | 9/2014 | Chelst | |

* cited by examiner

METHOD FOR EDUCATING USERS BY GAMIFICATION

CROSS-REFERENCE TO RELATED APPLICATIONS

The present application claims priority to PCT International Patent Application No. PCT/EP2017/054127, filed Feb. 23, 2017, and European Patent Application No. 16156998.3, filed Feb. 23, 2016, the disclosures of which are incorporated herein by reference.

STATEMENT RE: FEDERALLY SPONSORED RESEARCH/DEVELOPMENT

Not Applicable

BACKGROUND

1. Field of the Disclosure

The disclosure relates to the field of educating users by gamification, which may be used for educating employees in particular in their work environment, for example employees in the field of health care or other industries.

It is generally desired by a company, that its employees are well trained for the respective tasks of the employee. For this, it is oftentimes necessary to regularly improve the employee's skills, e.g. by training, further education, retraining or skill enhancement. As employees regularly use computers at their work place, they may also more generally be referred to as users.

However, it turns out that such trainings are often of no avail. This may be attributed to a low motivation of the respective user to be trained. Thus, a user to be trained may not remember the knowledge to be transferred. An additional problem may be that a user may not have enough time to participate in such training in the first place.

In order to resolve these problems, it has been suggested to apply game-design elements and/or game principles in so called non-game contexts, which concept is also known as gamification. Due to the use of game design elements in non-game contexts it has been found that for instance user engagement, organizational productivity or learning may be improved.

However, while this approach may address some of the above problems, there still remains the difficulty of how to incorporate training and education into a daily routine of a user and how to make sure that a user has enough time to take part in such a training session.

BRIEF SUMMARY OF SOME EMBODIMENTS OF THE INVENTION

In view of this, certain aspects and embodiments according to the invention may allow for an improved training and education of users. Certain aspects and embodiments according to the invention may allow for an increased motivation of users with respect to taking part in a training session. Certain aspects and embodiments according to the invention may allow for an improved integration of education and training in daily routines of a user. Certain aspects and embodiments according to the invention may allow for organizing such training and education of users with minimum organizational effort. Certain aspects and embodiments according to the invention may allow for providing a continuous and enduring education of a user. Certain aspects and embodiments according to the invention may achieve gamification of technical education through rewarding users for both technical knowledge and learning and from participating in team play. Certain aspects and embodiments according to the invention may make use of elements of surprise in order to achieve these aims.

According to a first exemplary aspect of the invention, a method for educating users by gamification performed by at least one apparatus is disclosed, the method comprising:
repeatedly generating data pertaining to a user interface element; and
providing the data pertaining to the user interface element,
the user interface element allowing a user using a first software section or a user interface thereof upon activation of the user interface element to access a second software section or a user interface thereof for educating users by gamification.

According to an alternative exemplary first aspect of the invention, a method for educating users by gamification performed by at least one apparatus is also disclosed, the method comprising:
repeatedly generating random data pertaining to a user interface element, the data being representative of a position of the user interface element; and
providing the data pertaining to the user interface element.

According to an alternative exemplary first aspect of the invention, a method for educating users by gamification performed by at least one apparatus is disclosed, the method comprising:
providing a first software section;
providing a user interface element for interaction with a user within the first software section or a user interface thereof;
providing, upon activation of the user interface element by the user, access to a second software section or a user interface thereof for educating the user by gamification.

According to the first aspect of the invention, also a computer program code is disclosed, the computer program code when executed by a processor causing an apparatus to perform the actions of the method of first aspect.

According to the first aspect of the invention, also a computer readable storage medium is disclosed in which computer program code of the first aspect is stored.

According to the first aspect of the invention, also an apparatus is disclosed configured to realize or comprising respective means for realizing the method of the first aspect of the invention.

According to the first aspect of the invention, also an apparatus is disclosed comprising at least one processor and at least one memory including computer program code, the at least one memory and the computer program code configured to, with the at least one processor, cause an apparatus at least to perform the method of the first aspect.

An apparatus according to the first aspect may also be referred to as a first apparatus.

As an example, an apparatus according to the first aspect can be one or more servers or a part thereof. A server is to be understood to mean, in particular, a data-processing unit in a network which communicates via the network with one or more data-processing units, the clients (e.g. desktop units or mobile terminals), in order to provide them with data, special services and/or computing power. The client or a part thereof may be a second apparatus as further described below.

In a client-server architecture of this type, the special services provided by the server and/or the computing power can be used by a plurality of clients so that the clients themselves, for example, have to retain less own computing power or, as another example, do not need to be provided with a larger database. A server and a client can in particular designate a data-processing apparatus, but also a program which is executed on the respective data-processing apparatus.

The network is, for example, a local area network, a wide area network, a virtual network, a radio network, a telephony network and/or the Internet. The communication is effected, for example, in a wireless or wire bound manner.

The server may, for example, be database server. Examples of a database server are a Microsoft SQL Server, an Oracle server and a MySQL server. The server and/or a client may in particular use one or more of the following technologies (such as frameworks, engines etc.) in order to provide its services (e.g. to implement the method of the first or second aspect): .NET Framework, IIS 7, ASP.NET Web API, Unity, Log4net, HandlebarJS and/or HTML 5.

The server may, for example, also be part (for example a "component") of a so called computer cloud which makes data-processing resources available dynamically to different users via a network. A computer cloud is intended to be understood to mean, in particular, a data-processing infrastructure according to the definition of the "National Institute for Standards and Technology" (NIST) for the term "Cloud Computing". An example of a computer cloud is a Microsoft Windows Azure Platform.

However, it is also generally conceivable, that the apparatus as another example may be a mobile terminal or a part thereof.

According to a second exemplary aspect of the invention, a method for educating users by gamification performed by at least one apparatus is described, the method comprising:
  repeatedly checking whether data pertaining to a user interface element has been generated; and
  receiving the generated data pertaining to the user interface element,
  the user interface element allowing a user using a first software section or a user interface thereof upon activation of the user interface element to access a second software section or a user interface thereof for educating users by gamification.

According to the second aspect of the invention, also a computer program code is disclosed, the computer program code when executed by a processor causing an apparatus to perform the actions of the method of second aspect.

According to the second aspect of the invention, also a computer readable storage medium is disclosed in which computer program code of the second aspect is stored.

According to the second aspect of the invention, also an apparatus is disclosed configured to realize or comprising respective means for realizing the method of the second aspect of the invention.

According to the second aspect of the invention, also an apparatus is disclosed comprising at least one processor and at least one memory including computer program code, the at least one memory and the computer program code configured to, with the at least one processor, cause an apparatus at least to perform the method of the second aspect.

An apparatus according to the second aspect may also be referred to as a second apparatus.

For instance, the second apparatus may be a data processing apparatus, such as a computer, a personal computer, a desktop computer, a thin client, or a part thereof. The second apparatus may also be a mobile terminal, such as a cellular phone, a laptop computer, a tablet computer, a multimedia player, a personal digital assistant, or a part thereof. For instance, the apparatus is or forms a part (e.g. as a module) of any of such a data processing apparatus.

According to a third aspect of the invention, a system comprising at least a first apparatus and a second apparatus is disclosed, the system configured to realize or comprising respective means for realizing the method according to the first and/or second aspect.

As described, the method of the first aspect relates to a user interface element, which upon activation (e.g. within a user interface of a first software section pertaining to the user's work) allows a user to access a second software section or a user interface thereof. The second software section allows for educating the user by gamification. Further, according to the method of the first aspect, data pertaining to the user interface element is generated repeatedly and the data is provided. The data may be provided to a second apparatus, which may be a client, for instance. Due to the generation and provision of the data pertaining to a user interface element, the behaviour of the user interface element can be influenced depending on the data. Just to name two examples, the data may represent a time for the user interface element to appear or the data may represent a position for the user interface element to appear. Thus, the method may in particular allow for influencing the engagement of the user with the second software section or a user interface thereof and thus with the education by gamification of the user.

According to non-limiting examples, the user interface element may be or comprise a button, a radio button, an icon, a picture, an image, a label or a text. However, further user interface elements may be utilized in the scope of the invention. Also, the user interface element may also comprise multiple buttons, pictures, texts etc.

The data pertaining to the user interface element may for instance comprise position information indicating the position of the user interface element or time information indicating a time, at which the user interface element is supposed to appear, and/or information indicating, whether the user interface element is supposed to appear at all. The data may be stored in a database provided by the first apparatus, for instance. The database may also comprise a user profile for every user. The data pertaining to the user interface element may thus be associated with a respective user, i.e. a user profile in the database.

That data pertaining to the user interface element may be repeatedly generated for a single user but also for each user of a plurality of users.

The user interface element may be activated by a user for instance by clicking the user interface element, by moving a cursor over the user interface element or by pressing a keyboard button, just to name some examples.

The first software section may provide a main or base software platform. The second software section may be a software module compatible with first software section. The second software section may be realized as an overlay application to the first software section. The first and second software sections may be different applications. However, the first and second software sections may not necessarily be independent from each other. Rather, the first and the second software section may also be different parts of a single application, for example.

As described, the method according to the second aspect repeatedly checks, whether data pertaining to a user interface element has been generated. The data is then received e.g. by a second apparatus such as a client. The second apparatus may for example pull the data from the first apparatus.

According to an exemplary embodiment of the method according to the first aspect, the first software section provides a work environment to the user. For instance, the first software section may be an application or a program used by the user (e.g. an employee) for executing work for the employer. The first software section may thus be continuously or regularly used by the user in the workday life. In contrast, the second software section may be configured for education and gaming.

According to an exemplary embodiment of the method according to the first aspect, at least one of the first software section and the second software section is or is part of a web application.

According to an exemplary embodiment of the method according to the first aspect, the data pertaining to the user interface element is generated periodically. For instance, the data may be generated every hour, every day or every week.

According to an exemplary embodiment of the method according to the first aspect, the data pertaining to the user interface element is at least partially random, preferably within a predetermined range. The random data allows effectively incorporating an element of surprise into the process of education by gamification, because the user to which the user interface element may be displayed will for instance not know, when and/or where in the first software section the user interface element will be displayed. If the data is within a predetermined range, undesired data values can be prevented. For instance, if the data is representative of a position of the user interface element, the predetermined range may be between 0 and a maximum possible value, e.g. representative of the screen size.

According to an exemplary embodiment of the method according to the first aspect, the data pertaining to the user interface element is representative of a position of the user interface element. Data representative of a position of the user interface element may comprise an x-position and a y-position, for example.

According to an exemplary embodiment of the method according to the first aspect, the user interface element is a graphical user interface element. A graphical user interface element may be visually displayed to the user of the second apparatus. A graphical user interface element may effectively attract the attention of the user.

According to an exemplary embodiment of the method according to the second aspect, the method further comprises:
displaying the user interface element to the user in accordance with the generated data.

While the data pertaining to the user interface element may be generated according to the first aspect, the user interface element may then be displayed according to the second aspect, i.e. for instance by a method and apparatus according to the second aspect.

According to an exemplary embodiment of the method according to the first aspect, the data pertaining to the user interface element is only generated and/or provided during a predetermined time period, the time period preferably representing a game segment. The predetermined time period may be hours, days or weeks, for instance. The predetermined time period may represent a certain segment of a game. A game segment may start on Saturday (e.g. 6 am) and end on Friday (e.g. 6 pm), to provide an example. This time period may be repeated, however.

According to an exemplary embodiment of the method according to the first aspect, the method further comprises:
determining whether the user interface element has been activated by the user.

Determining, whether the user interface element has been activated by the user may be performed in the scope of the first method, i.e. by the first apparatus. For this, it may be necessary, that the method and/or apparatus according to the second aspect provide information for determining such activation.

According to an exemplary embodiment of the method according to the first aspect, the method further comprises:
marking the generated data pertaining to the user interface element as used, if it is determined that the user has activated the user interface element.

The generated data pertaining to the user interface element may be marked (e.g. flagged) as used by a respective entry into a dataset of a database. For this, a second apparatus (e.g. a client) used by the user activating the user interface element may provide corresponding information to a first apparatus (e.g. a server). The respective data pertaining to the user interface element can then be marked as used.

According to an exemplary embodiment of the method according to the first aspect, the method further comprises:
providing education data associated with the second software section for educating the user, in particular testing the user with a test, if it is determined that the user has activated the user interface element.

The education data may for instance be stored in a database of a first apparatus (e.g. a server). That the education data is associated with the second software section is in particular understood to mean that the education data is used for the second software section (but not the first software section). For instance, the education data may comprise information, which enables a second apparatus (e.g. a client) to educate the user, in particular with a test, within the second software section. However, the providing and/or the testing shall only be performed if it is determined that the user has activated the user interface element. Thus, the user has the option of not engaging with or accessing the second software section or a user interface thereof and thus not being educated.

Accordingly, the method of the second aspect may comprise receiving education data associated with the second software section for educating the user, in particular testing the user with a test, if it is determined that the user has activated the user interface element.

According to an exemplary embodiment of the method according to the first aspect, the method further comprises:
testing or triggering testing the user based on the education data associated with the second software section.

After an activation of the user interface element by the user indicating that the user wants to engage with the second software section (i.e. wants to play the game), the user can access the second software section for educating users by gamification. The testing is based on the education data which is provided e.g. by a first apparatus to a second apparatus. Triggering testing may in particular be performed by a first apparatus (e.g. a server) for example by providing corresponding instructions and/or data, while testing may in particular be performed by a second apparatus (e.g. a client).

However, as explained before, the user interface element may also provide multiple ways of interaction for the user, e.g. by comprising multiple buttons. Thus, the user does not necessarily have to activate the user interface element for accessing the second software section. As an example, the user may also be able to activate the user interface element to delay or postpone the access to the second software section for a predefined time, in particular a predefined number of minutes. This may be determined by first apparatus. For this, the user interface element may provide an additional delay button of the user interface element, for instance. Choosing this delay may cause the user interface element to disappear from the first software section (and thus from the user's screen), e.g. for 15 or 30 minutes. After the corresponding timeframe (e.g. the 15 or 30 minutes), the user interface element will appear (or will be triggered to appear) on the basis of the previously generated data pertaining to the user interface element (that is for example at the same x and y coordinates, as before). This delay may be repeated. However, after a predefined number of delays (e.g. on the 3rd of such a delay), it is determined (e.g. by the first apparatus), that the user interface element based on the specific generated data is to be skipped completely, which will mark the generated data pertaining to the user interface element as used (as described before). Only after again generating data pertaining to a user interface element, the user interface will then again be shown to the user based on the newly generated data. Additionally or alternatively, the user interface element may also allow for directly skipping the engagement with the second software section with the user interface element based on the specific generated data (e.g. with an additional skip button of the user interface element). Choosing this skip will directly mark the generated data pertaining to the user interface element as used so that the user will need to wait for new data to be generated to access the second software section again.

It is further advantageous, that in case it is determined that the user has chosen to skip accessing the second software section (that is to not activate the user interface element for accessing the second software section), a predefined amount of times (e.g. 3 times), sending a notification to a designated person may be triggered. The notification may comprise user related information (e.g. a record of the user). The notification may be sent by email to a corresponding supervisor, for example, in order to alert them that the respective user is not accessing the second software section.

Additionally or alternatively, a report may be generated on request or on a timed basis, which report may comprise the described information (that is the user related information and an indication of the user skipping accessing the second software section).

According to an exemplary embodiment of the method according to the first aspect, the education data associated with the second software section for testing the user comprises at least a question to be answered by the user and optionally possible answers to the question. Thus, testing the user may comprise asking the user one or more questions, in particular multiple choice questions. The questions may be of different difficulty levels. For instance, a certain difficulty level (e.g. out of four possible levels) may be assigned to each question. Based on further circumstances, a question of a certain difficulty level may be chosen. For instance, a user may select a certain difficulty level. To provide another example, the user may be asked to increase the difficulty level after a predetermined number (e.g. five) of correct (consecutive) answers.

According to an exemplary embodiment of the method according to the first aspect, the method further comprises:
displaying or triggering displaying to the user the question to be answered by the user and optionally the possible answers.

Generally, it is also possible to display multiple questions (e.g. one after another). Triggering displaying may in particular be performed by a first apparatus (e.g. a server) for example by providing corresponding instructions and/or data, while displaying may in particular be performed by a second apparatus (e.g. a client).

It may be determined, if the user has answered the question correctly or incorrectly. If it is determined, that the question was answered incorrectly, sending a notification to a designated person, e.g. a supervisor, may be triggered. For instance, the notification may comprise user related information (e.g. a record of the user) and/or the question. The notification may be sent by email to the corresponding supervisor, for example. In this way, the supervisor can become aware of areas where the respective users need further education.

Additionally or alternatively, a report may be generated on request or on a timed basis, which report may comprise the described information (that is the user related information and the incorrectly answered question).

According to an exemplary embodiment of the method according to the first aspect, the method further comprises:
accepting a correct answer to the question given by the user, only if it was given within a predetermined time limit.

For instance, the predetermined time limit may be of the order of seconds or minutes. As an example, the predetermined time limit may be 5, 10, 15 or 20 seconds, for example.

According to an exemplary embodiment of the method according to the first aspect, the method further comprises:
increasing a score associated with the user, if it is determined that the user has passed the test.

It may in particular be determined that the user has passed the test, if a correct answer to the question was given by the user. The score may be stored in a database of a first apparatus (e.g. a server). For instance, the score may be represented by an integer number. The score associated with a user may regularly be reset (e.g. set to zero) after certain time periods (e.g. after days, weeks or months).

According to an exemplary embodiment of the method according to the first aspect, the education data associated with the second software section for testing the user is related to the user's profession, working environment and/or employment. For instance, if the user is employed in the health care sector, the education data may comprise a question about the coverage of health care insurance, just to name an example.

According to an exemplary embodiment of the method according to the first aspect, the method further comprises:
performing an action related to a game associated with the second software section, in particular when a user has passed the test based on the education data associated with the second software section.

An action related to a game may also be referred to as a game related action. A game is understood as any kind of game playable on a data processing apparatus, such as the second apparatus (i.e. in particular a computer, a laptop, a smart phone etc.). The game may preferably be a turn-based game, for instance, a (virtual) card game. That the game is associated with the second software section is in particular understood to mean that the game related actions can in particular be performed (i.e. the game can effectively be played) by the user in the second software section (but preferably not the first software section). A game related action can thus in particular only be performed when a user has passed a test, e.g. has successfully answered a question. This may in particular motivate the user to perform well with respect to a test. A simple example of a game related action is to make a move on a virtual board game or to draw a card from a deck in a virtual card game.

According to an exemplary embodiment of the method according to the first aspect, the performing of the game related action comprises generating, storing, updating and/or providing game data associated with the game associated with the second software section. For instance, the game data may comprise information representative of the current status of the game. As an example, in case of a virtual card game, data representing a card, which is available and which the user may draw from the deck, may be generated. As a further example, the game data representative of the cards on a user's hand, which may be stored in a database of the first apparatus, may be updated. This game data may be provided (e.g. from a first apparatus (e.g. a server) to a second apparatus (e.g. a client)).

Accordingly, with respect to an example of a method according to the second aspect, the method may comprise receiving game data associated with the game associated with the second software section.

According to an exemplary embodiment of the method according to the first aspect, the method further comprises:
increasing a score associated with the user if it is determined that the user has achieved a predetermined aim in the game.

It may in particular be determined that the user has achieved a predetermined aim in the game, if the game, a game segment or a game round was won by the user. Similar to the score for passing the test, as already described, the score may be stored in a database of a first apparatus (e.g. a server). For instance, the score may be represented by an integer number. The score associated with a user may regularly be reset (e.g. set to zero) after certain time periods (e.g. after days, weeks or months). The score for passing the test and the score for achieving an aim in the game may be saved individually or as a common overall score.

According to an exemplary embodiment of the method according to the first aspect, the method further comprises:
providing or triggering providing additional game related options to the user in dependence of the state of the game.

For instance, this may be the case, if it is determined that the user has already passed the test based on the education data associated with the second software section a predetermined number of times (e.g. two times). For instance, in the example of the game being a virtual card game, a state of the game may inter alia be characterized by the number of cards a user has on its hand. If it is determined for example, that the user has already drawn two cards and thus has two cards on his hand, the user may have said additional game related options, e.g. to double a bet. For instance, if the card game is Black Jack, the user may have the option of "stand", "split", "double" or "hit". These options may be display to the user in a user interface by a second apparatus, for example.

According to an exemplary embodiment of the method according to the first aspect, the method further comprises:
exiting or triggering exiting the second software section or a user interface thereof and returning to the first software section or a user interface thereof.

Exiting the first software section may in particular be understood to mean that the user cannot interact with the second software section anymore. For instance, the second software section may comprise a graphical user interface provided as an overlay over a graphical user interface the first software section. When exiting the second software section, the graphical user interface may be closed or removed, so that the user can access the graphical user interface of the first software section again. Exiting the second software section may in particular be performed after performing one or more actions related to the game associated with the second software section. The user may continue work at that point, at which the user interface element was previously activated.

According to an exemplary embodiment of the method according to the first aspect, the method is performed for a plurality of users. For instance, a first apparatus (e.g. a server) may be provided for performing the method of the first aspect. Further, a plurality of second apparatuses may be provided, which may be used by the plurality of users. User specific data (e.g. a user specific score, user specific game data etc.) may be stored for the plurality of users in a database of a first apparatus.

According to an exemplary embodiment of the method according to the first aspect, the method further comprises:
determining, among a plurality of users, users meeting a predetermined qualifier; and
assigning the users meeting the predetermined qualifier to groups.

The plurality of users, among which the users are determined, may be represented by all available users. However, the plurality of users may already be a subgroup of all available users. The predetermined qualifier may allow for selecting users with a specific property. A determined user may then be assigned to a group by associating a respective user profile (which may be stored in a database of a first apparatus, for example) to a specific group or to other user profiles. A group may consist of a fixed number (e.g. five) of users. The users may be randomly assigned to the groups.

However, there may be a limitation for the assigning of users to a group. For instance, only users employed in one department, in one division and/or in one company may be grouped together.

According to an exemplary embodiment of the method according to the first aspect, the predetermined qualifier requires a user to be among a top scoring fraction of users. For instance, the top 30%, top 20%, or top 10% of all available (e.g. organization-wide) users (with respect to the score associated with the respective user) meet the predetermined qualifier.

According to an exemplary embodiment of the method according to the first aspect, the determining of users meeting the predetermined qualifier and the assigning of the users meeting the predetermined qualifier to groups is performed regularly, in particular periodically. The determining of users and assigning of the users to groups may be performed after a predetermined time, for instance after a fixed amount of hours, days, weeks, months or years. As an example, the determining of users and assigning of users to groups may be performed every quarter, i.e. every three months.

According to an exemplary embodiment of the method according to the first aspect, the method further comprises
regularly determining users to receive a reward; and
providing information associated with respective rewards to respective users.

The determining of users to receive a reward and providing of information may be performed after a predetermined time, for instance after a fixed amount of hours, days, weeks, months or years. As an example, the determining of users to receive a reward and providing of information may be performed in accordance with the determining of users and assigning of the users to groups, as described before. Thus, as an example, the determining of users to receive a reward and providing of information may also be performed every quarter, i.e. every three months.

Accordingly, the information associated with respective rewards may be received at a second apparatus of the respective user (e.g. a client).

According to an exemplary embodiment of the method according to the first aspect, the determining of users to receive a reward comprises determining users of a top scoring fraction of users. For instance, only the users of a top scoring fraction of users are then determined as users to receive a reward. For instance, the top 30%, top 20%, or top 10% of all available (e.g. organization-wide) users (with respect to the score associated with the respective user) may be determined to receive a reward. Additionally or alternatively, to name another example, only the top two users may be determined to receive a reward.

According to an exemplary embodiment of the method according to the first aspect, the information associated with respective rewards is provided to respective users, e.g. by means of electronic mail. A reward may be a cash payment, a gift card, a physical gift, a workplace related benefit, to name a few examples. For instance, the user may be provided with electronic voucher information (e.g. of a third party).

The features and example embodiments of the invention described above may equally pertain to the different aspects according to the present invention.

It is to be understood that the presentation of embodiments of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE DRAWINGS

These and other features and advantages of the various embodiments disclosed herein will be better understood with respect to the following description and drawings, in which like numbers refer to like parts throughout, and in which.

These and other features and advantages of the various embodiments disclosed herein will be better understood with respect to the following description and drawings, in which like numbers refer to like parts throughout, and in which.

DETAILED DESCRIPTION

The detailed description set forth below is intended as a description of the presently preferred embodiment of the invention, and is not intended to represent the only form in which the present invention may be implemented or performed. The description sets forth the functions and sequences of steps for practicing the invention. It is to be understood, however, that the same or equivalent functions and sequences may be accomplished by different embodiments and that they are also intended to be encompassed within the scope of the invention.

Figure 1:
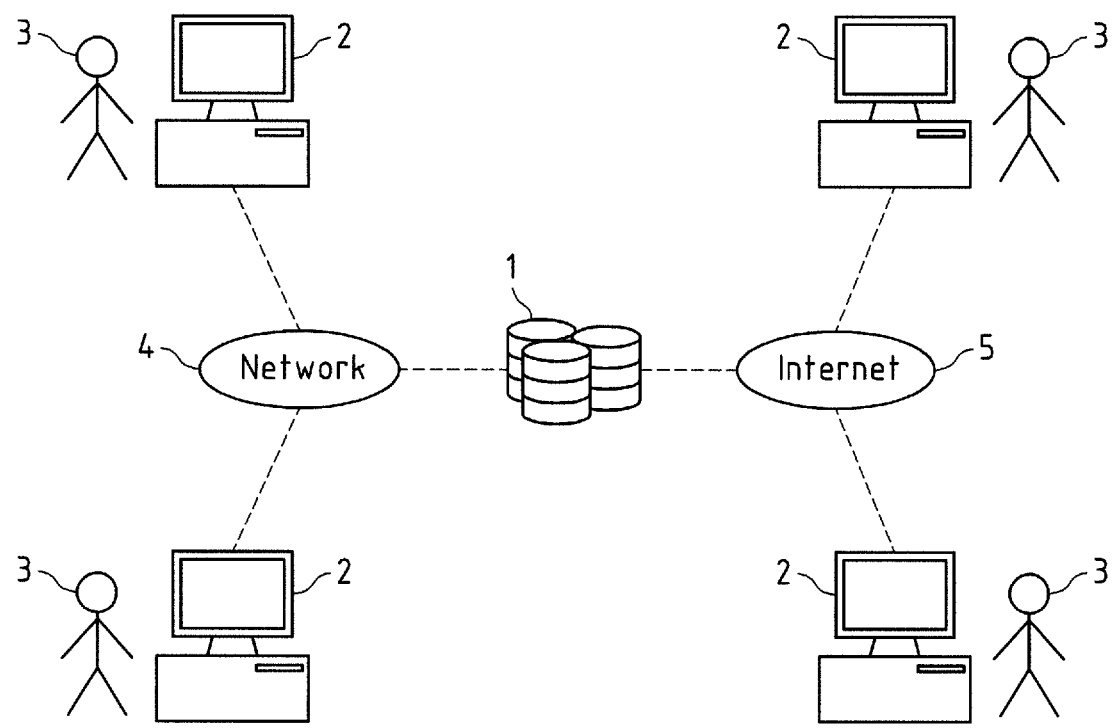
FIG. 1 is a schematic illustration of a first apparatus and a plurality of second apparatuses with respective users.

FIG. 1 illustrates a first apparatus 1, which is a server, in particular a database server such as a Microsoft SQL Server, an Oracle server or a MySQL server. The components of the server 1 are described in more detail with respect to FIG. 2. The server 1 may also comprise multiple data-processing units and/or databases, which are not necessarily provided in one place. The server 1 is in communication with a plurality of second apparatuses 2 of respective users 3. The second apparatuses 2 are clients of server 1 in this case. The clients 2 are depicted as desktop computers. However, it is equally well possible, that the clients 2 are mobile terminals, such as a cellular phone, a laptop computer or a tablet computer, for instance. The components of the clients 2 are also described in more detail with respect to FIG. 2. The communication between the server 1 and the clients 2 is provided over communication networks 4, 5. For instance, the clients 2 may be connected to the server over a local area network (LAN), such as network 4. Alternatively or additionally, some or all of the clients 2 may be connected to the server 1 over a wide area network 5, such as the Internet. However, it is also possible that the server 1 and the clients 2 are connected at least in part over a wireless communication network, such as for instance a 2G, 3G or 4G communication system or a WLAN network, for instance. The communication networks 4, 5 allow data to be exchanged between the server 1 and the clients 2.

The server 2 comprises a database. The database may inter alia store user profiles for the different users 3. Each user 3 may use a respective client 2 to log into their respective user profile stored in the database of server 1. The database of server 1 may also store further data and information, such as data pertaining to the user interface element, education data, game data and/or a score associated with a user 3, just to name a few examples.

The server 1 may in particular allow clients 2 to run a web application. The clients 2 allow users 3 to interact with a web application (e.g. the first and/or the second software section). For this, the clients 2 may provide a graphical user interface to the users 3. The clients 2 may interact with server 1 in order to provide the desired functionality of the web application. The server 1 and/or the clients 2 may in particular use one or more of the following technologies in order to provide the desired functionality: .NET Framework, IIS 7, ASP.NET Web API, Unity, Log4net, AngularJS and/or HTML 5.

Apart from the database, the server 1 may in particular provide a Windows Service (or another Background Service) and a Web Service. The Windows Service may in particular generate data (e.g. pertaining to a user interface element) or determining users 3 to receive a reward, for instance. The Web Service may in particular facilitate communication between the clients 2 and the server 1 (in particular the database) and apply rules to the data that is transmitted between a client 2 and the server 1 (in particular the database).

The first apparatus 1 and one or more of the second apparatuses 2 may be considered as an exemplary embodiment of a system according to the third aspect.

Figure 2:
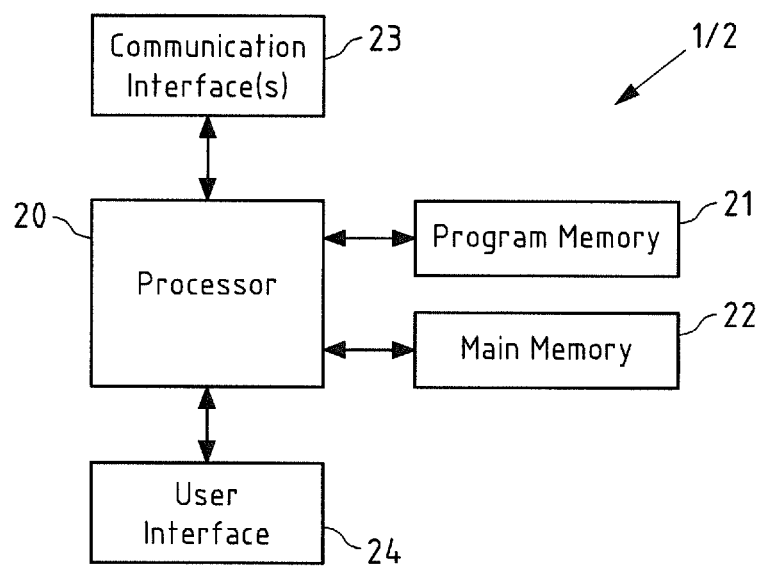
FIG. 2 is a block diagram of an exemplary apparatus of FIG. 1.

FIG. 2 is a block diagram of an exemplary apparatus 1/2, which may be an example of the first apparatus 1 and/or the second apparatus 2 of FIG. 1. The apparatus 1/2 is an example embodiment of a first or second apparatus according to the invention. For instance, the apparatus 1/2 is or forms a part (e.g. as a module) of a data processing apparatus, such as server 1 or client 2 of FIG. 1. Non-limiting examples of such an apparatus are a server, personal computer, a desktop computer, a cellular phone, a personal digital assistant, a laptop computer, a tablet computer or a multimedia player.

Apparatus 1/2 comprises a processor 20. Processor 20 may represent a single processor or two or more processors, which are for instance at least partially coupled, for instance via a bus. Processor 20 executes a program code stored in program memory 21 (for instance program code causing apparatus 2 to perform one or more of the embodiments of a method according to the invention (as for instance further described below), when executed on processor 20), and interfaces with a main memory 22. Some or all of memories 21 and 22 may also be included into processor 20. One of or both of memories 21 and 22 may be fixedly connected to processor 20 or at least partially removable from processor 20, for instance in the form of a memory card or stick. Program memory 21 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Program memory 21 may also comprise an operating system for processor 20. Program memory 20 may for instance comprise a first memory portion that is fixedly installed in apparatus 2, and a second memory portion that is removable from apparatus 2, for instance in the form of a removable SD memory card.

In case of server 1, the program memory 21 may comprise the database and the corresponding data. Main memory 22 may for instance be a volatile memory. It may for instance be a RAM or DRAM memory, to give but a few non-limiting examples. It may for instance be used as a working memory for processor 20 when executing an operating system and/or programs.

Processor 20 further controls a communication interface 23 configured to receive and/or output information. For instance, communication interface 23 may be configured to exchange information, i.e. to send and receive data to/from a respective other apparatus, e.g. between a first apparatus 1 and a second apparatus 2 of the system as shown in FIG. 1. This may for instance comprise sending data pertaining to the user interface element, education data, and/or game data from server 1 to a client 2. Server 1 may receive such data from a corresponding database. The communication may for instance be based on a wireless or wire bound connection. Communication interface 23 may thus for instance comprise circuitry such as modulators, filters, mixers, switches and/or one or more antennas to allow transmission and/or reception of data. In embodiments of the invention, communication interface 23 is configured to allow communication over a network 4 and/or the Internet 5. Nevertheless, the communication route between server 1 and client 2 may equally well at least partially comprise wire-less portions. For instance, server 1 may be communicate with a client 2 over a 2G/3G/4G cellular communication system and/or a non-cellular communication system, such as for instance a WLAN network.

Processor 20 further controls a user interface 24 configured to present information to a user, for example, in case of the second apparatus 2, user 3 and/or to receive information from such a user 3. User interface 24 may for instance be the standard user interface via which a user of apparatus 2 can interact with apparatus 2 and in particular to interact with the first and second software section. Such an interface may in particular comprise input means, such as a keyboard and/or a mouse, output means, such as a display, or combined input/output means, such a touchscreen. The user interface 24 may also be used to control other functionality of apparatus 1/2, such as browsing the Internet, etc.

The components 21-25 of apparatus 2 may for instance be connected with processor 20 by means of one or more serial and/or parallel busses.

An exemplary method according to the first and the second aspect will be described in the following in connection with FIGS. 3 to 7, each figure illustrating a display or a portion thereof of a client 2 at different times while the respective method is performed. The method is performed by a system comprising a first apparatus (e.g. server 1) and a plurality of second apparatuses (e.g. clients 2).

The following example describes the process of education by gamification in the context of a virtual card game, called "Black Jack". However, this is to be understood merely as an example and other games may equally well be used.

Figure 3:
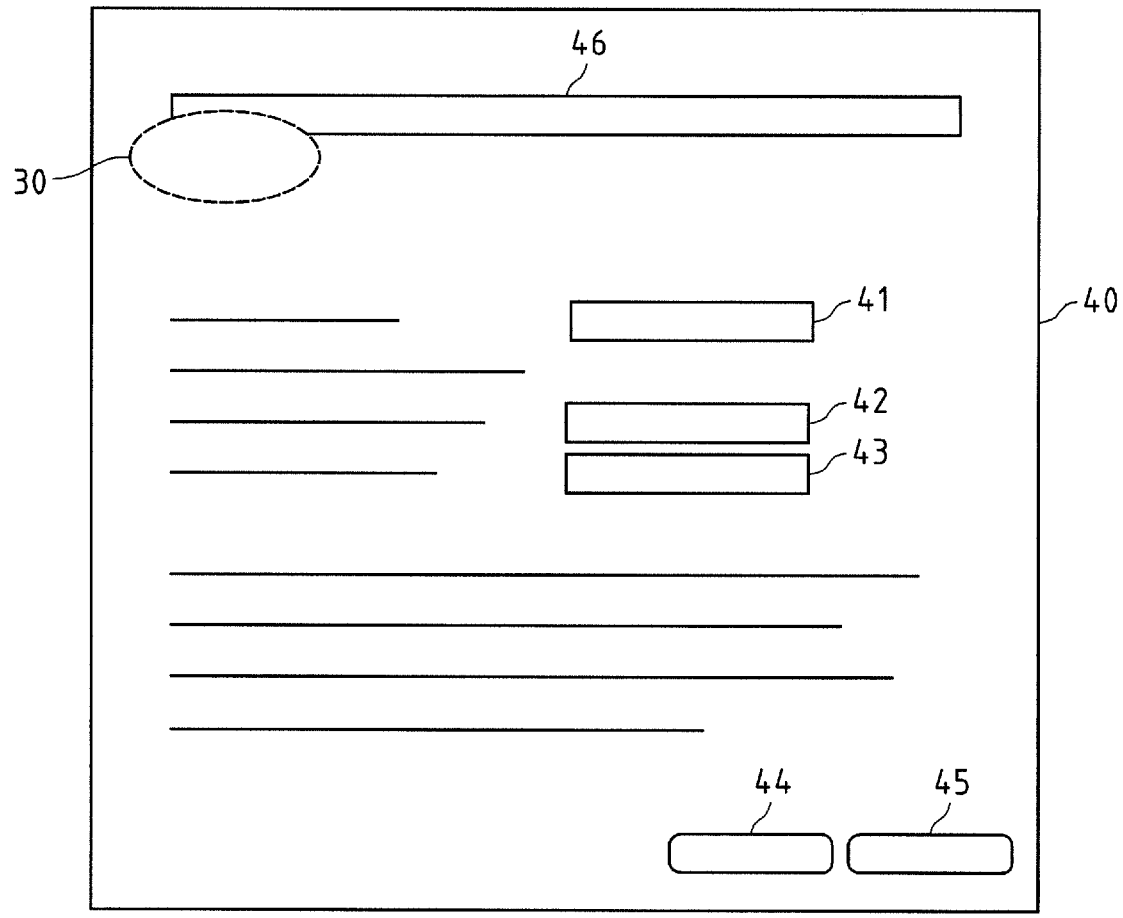
FIG. 3 a schematic illustration of a display of a client 2, when displaying a user interface element in the user interface of a first software section.

FIG. 3 shows a schematic illustration of a display of a client 2, when displaying a user interface element 30 in the user interface 40 of a first software section.

By means of the user interface 40, a first software section may provide a work environment for the user 3 via a plurality of user interface elements 41, 42, 43, 44, 45, 46, such as text fields, buttons, menus etc. The time period of a game segment or game round (which may also be considered a full game) may be started on Saturday (6 am) and ended on Friday (6 pm). However, other time periods are possible, as well.

During this time period, a Windows Service of server 1 may run at 09:00 am, for example, and generate data pertaining to the user interface element 30 for a specific user 3. The generated data pertaining to the user interface element is stored in the database of server 1. The generated data pertaining to the user interface element 30 comprises data which is representative of a position of the user interface element 30. For this, values for a pair of coordinates (x_pos, y_pos) are within certain limits randomly generated by server 1.

The user 3 may then log into the system via a respective client 2 at 09:07 am, for example. The client 3 contacts the server 1 (in particular the Web Service) with the login details that the user 3 has provided. A WebAPI can check the details against the information stored in the database of the server 1 and may log the user 3 in.

The client 2 is configured for repeatedly checking whether data pertaining to the specific user 3, which is logged in, has been generated and is available. As an example, the client 2 may do this at 09:08 am. For this, the client 2 contacts the Web Service of the server 1 to retrieve available generated data pertaining to the user interface element 30 for the respective user 3 from the database. Since such data has been generated for the user 3, server 1 provides the generated data pertaining to the user interface element 30 to the client 2 and the client 2 receives the generated data pertaining to the user interface element 30. This may be a pull or push process.

The client 2 will then display the user interface element 30 at the corresponding x and y coordinates that were generated for the user interface element 30. The user interface element 30 is in this case a graphical user interface element, in particular comprising a button, e.g. graphically inviting the user to play a game.

An administrator is able to give various game accesses to users within their given departments. For instance, the administrator may specify whether a user is required to play, can optionally play or is not required to play.

Via an input means the user 3 can activate the user interface element 30, e.g. by clicking on it, from within the first software section, in particular the user interface 40 of the first software section.

Upon activating the user interface element 30, the user may be given a choice to actually play or postpone a game (e.g. for 15-minutes or 30-minutes). However, if a user has already postponed a game twice, and if it is postponed a third time, the user loses the game segment or round.

The user has activated the user interface element 30 (e.g. choosing to press 'Play' on the user interface element 30), for example at 09:09 am. The client 2 will contact the Web Service of the server 1 in order to mark the generated data pertaining to the user interface element 30 as used in the database.

At this point, the Web Service may also generate further needed information required for gameplay and may store it in the database of server 1.

The client 2 will now request education data associated with the second software section from the Web Service. The education data may comprise a question and the possible answers to the question. The questions and answer combinations are stored in the database of server 1. Once the client has received the education data, i.e. the question and corresponding answers, the client 2 displays the question 51 and possible answers 52 to the user, as shown in FIG. 4.

Figure 4:
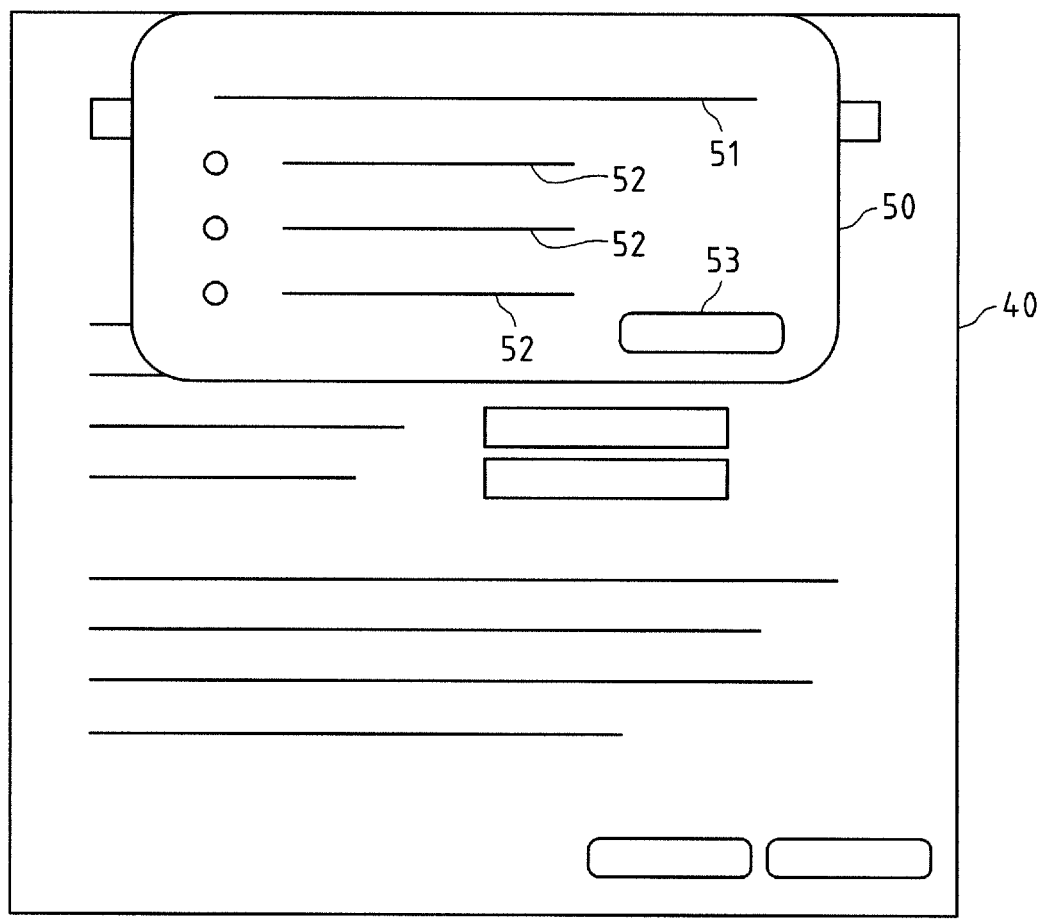
FIG. 4 a schematic illustration of a display of a client 2, displaying a user interface of a second software section as an overlay over the user interface of the first software section.

FIG. 4 shows a schematic illustration of the display of the client 2, displaying a user interface 50 of the second software section as an overlay over the user interface 40 of the first software section. The user interface 50 of the second software section displays the question 51 and possible answers 52 to the user 3. The question that has been asked will be linked to the respective user 3 in the database.

FIGS. 3 and 4 illustrate, how the user 3 using the first software section can access the second software section for education by gamification from within the user interface 40 of the first software section upon activation of the user interface element 30.

With respect to the question difficulty, the difficulty may vary e.g. by the quarter, that is being played (as will be explained in further detail below). The questions may be of the difficulty "low", "moderate", "high" and "championship high", for example. If the user 3 answers five consecutive questions correctly, the user 3 is to be given an opportunity to move up to the next difficulty level of questions. This may influence the amount of increase of a score associated a user (as will also be explained in further detail below).

When the question 51 is displayed, the user only has a predetermined amount of time, e.g. 15 seconds, to answer the question 51.

The user 3 may for example choose answer B from the list of answers 52 on the client 2 and may hit a 'Submit Answer' button 53. At this point the client 2 will contact the Web Service of server 1 with the given answer. The Web Service of the server 1 will check the answer against the database and in this case return true as the answer is correct. The result is stored in the database of server 1.

For a correct answer, a score associated with the user 3 will be increased, i.e. the user 3 will be awarded points. An overview of how many points can be achieved will be provided below.

Figure 5:
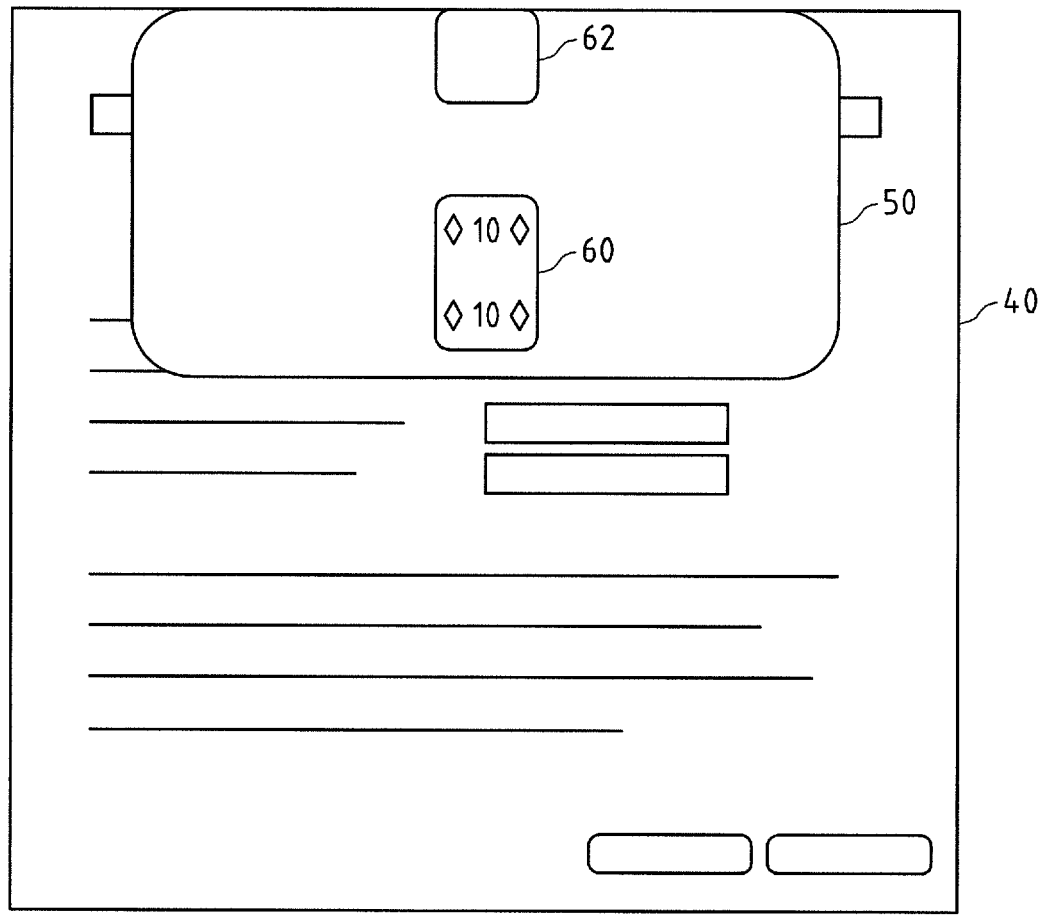
FIG. 5 a schematic illustration of a display of a client 2, when a user has answered a question correctly.

FIG. 5 shows a schematic illustration of the display of the client 2, when a user has answered the question 51 correctly. As will be described in the following, actions related to a card game will now be performed, in particular a virtual game item (in this case a card 60) will be given to the user 3.

The client 2 will contact the Web Service of server 1 and query to generate a random card from the list of available cards for that game. For instance, in a one-deck game each card can logically only appear once in a game segment or round. For this, the Web Server will query the database to see which cards are available and randomly select one and then associate the selected card with the respective user 3 in the database. Thus, game data will be generated and/or updated in the database.

Game data representative of the chosen card is then provided to the client 2. The server 1 will also generate a random card 62 for the dealer in the same manner and store this information in the database.

The client 2 will display that the correct answer has been given and, as illustrated in FIG. 5, will also display the card 60 that was generated for the user 3 and the card 62 that was generated for the dealer.

The client 3 will then initiate a countdown timer to ensure that the user interface 50 of the second software section disappears in a timely manner so that the user can continue with their normal work with the user interface 40 of the first software section. In other words, the client exits the second software section and returns to the first software section. The segment or round of the game will continue at appearance of a next user interface element 30.

In case the user 3 would have chosen an incorrect answer from the list of answers 52, the user may see the correct answer and optionally the card 60, which the user would have received.

In dependence of the state of the game, e.g. once the user 3 has received two cards as described above, the gameplay may change, as will be described in connection with FIG. 6, which shows a schematic illustration of a display of the client 2, when additional game options are provided to the user 3.

The generation of data pertaining to a user interface element 30 and the activation of the element by the user 3, as was described above in particular in connection with FIG. 3, are repeated.

However, the server 1 may determine that it is recorded in the database that the user 3 already has two cards. In that case, a different user interface 70 of the second software section is displayed by the client 2 for user 3. Instead of asking a question the client 2 displays directly the game board. Data representative of the game board is retrieved by the client 2 via the Web Service of the server 1 from the database of server 1. The game board shows the two user cards 60, 61 and the dealer cards 62, 63. The user interface 70 of the second software section also displays user interface elements 71, 72, 73, 74 for providing the additional game options "Stand", "Split", "Double" and "Hit". These game options are specific to the game of "Black jack". The additional game options provided by user interface elements 71, 72, 73, 74 may change in dependence of the game that is played.

Figure 6:
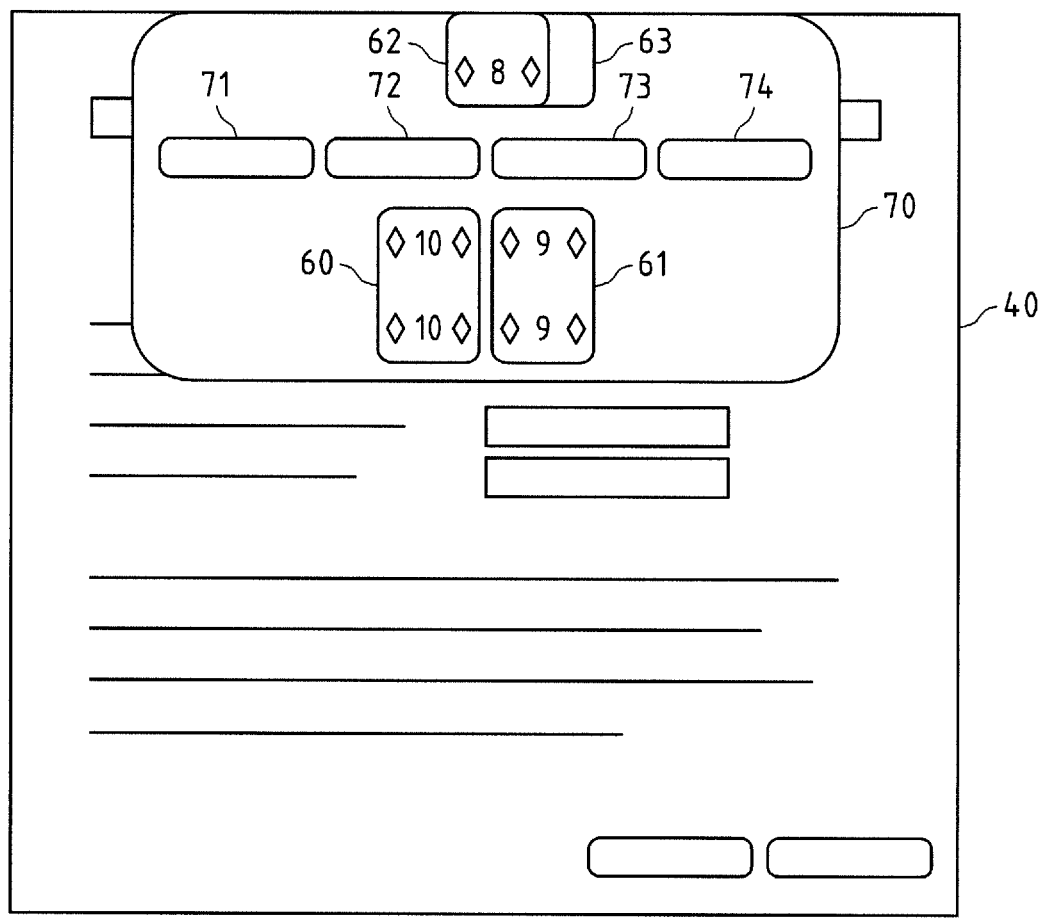
FIG. 6 a schematic illustration of a display of a client 2, when additional game options are provided to a user.

In the situation shown in FIG. 6, the user's hand consists of a 10 of diamonds and a 9 of diamonds. The user 3 chooses the "Stay" option on the client 2.

Via the "Hit" option, the user could have request another card and the client 2 would then request education data, i.e. a question and answers as described above. That means that the user 3 would need to answer a question again and the client 2 would send a request to the Web Service of server 1, which would randomly generate another available card as explained above.

However, in the current case the user has won the game segment or round. The user's and the dealer's hands are evaluated by the Web Service of server 1 and as the user 3 now has more points (19 points) than the dealer (18 points), the user has won the game segment. Data representative of the result may then be provided to the client 2 and stored in the database.

Figure 7:
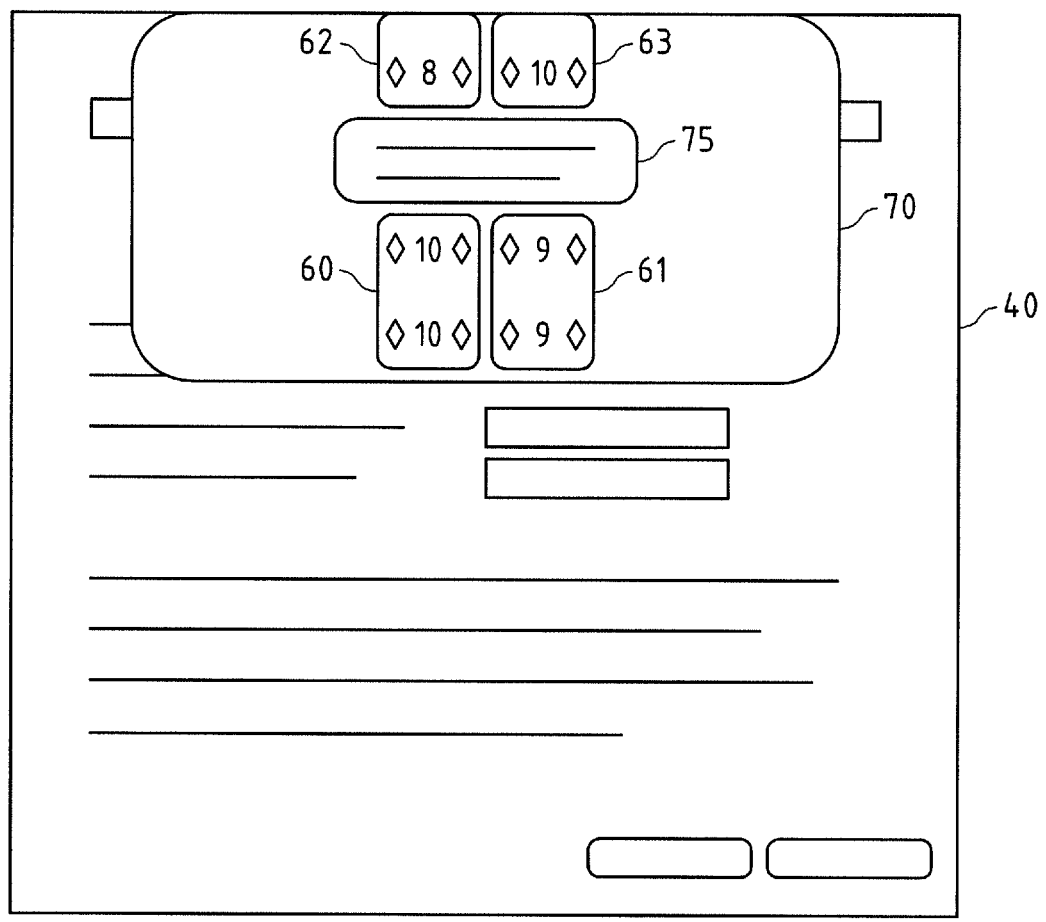
FIG. 7 a schematic illustration of a display of a client 2, when a user has won a game segment.

FIG. 7 shows a schematic illustration of the display of the client 2, when the user 3 has won the game segment. The client will display a user interface element 75, informing the user 3 that the user 3 has won. Again, the client 3 will then initiate a countdown timer to ensure that the user interface 70 of the second software section disappears after a predetermined time so that the user can continue with their normal work with the user interface 40 of the first software section.

As the user 3 has achieved a predetermined aim in the game (winning a game segment), a score associated with the user 3 is increased, which is stored in the database. However, if player loses the card game ("busts"), no points are to be awarded.

With respect to the score of a user 3, it is noted that points may be awarded in two categories: 1) correct answers given and 2) winning a game segment. The score of a user 3 may be recorded individually with respect to the above categories or as a total score.

As already explained, the above method may be performed for a plurality of clients 2 and users 3, respectively. By way of example, it will be explained in the following, how users may be assigned to groups and how users 3 may be determined to receive a reward. In the following example, it is assumed that the methods described above are used and repeated in the scope of a game mode lasting a year divided into quarters. However, these time periods are only exemplary.

During the first quarter (three months, e.g. January to March), the users 3 play individually. The question difficulty is "low" and the users 3 are ranked within individual departments only. The individual user's objective is to beat the dealer at "Black Jack" by answering as many questions correctly and by beating the dealer. Throughout a game segment (a week), for each correct answer given, the user will increase the respective score by a predetermined mount of points (e.g. 4 points). At the end of game segment (i.e. the week), the user 3 can win another predetermined amount of points (e.g. 10 points), if the user 3 wins the game segment. On a regular (e.g. monthly) basis, the users 3 are determined to receive a reward (e.g. the top 30% of all users across all companies will win an e-gift card). At the end of the quarter, a top scoring fraction (e.g. the top 30%) of all users (predetermined qualifier), across all companies, will advance to the second quarter, "Team Play" (see below). In other words, it is checked which users 3 among the plurality of users meet a predetermined qualifier. Further, at the end of the first quarter, a top scoring fraction (e.g. the top two users) may win an additional prize each (e.g. a cash prize).

In the beginning of the second quarter (three months, e.g. April to June) the user's scores/points are reset to zero. For the team play users (see above), the question difficulty is increased, e.g. set to "Moderate". The users 3 meeting the above predetermined qualifier are assigned to groups. The team play users 3 are placed in random groups within the same department across all companies. During the team play, a user 3 is able to see the points and cards (open/closed) of the other users of the same group. During the second quarter, the points for each correct answer given is increased (e.g. set to 6 points). At the end of a game segment (i.e. the week), the user 3 can win another predetermined amount of points (e.g. 15 points), if the user 3 wins the game segment. On a regular (e.g. a monthly) basis, those users 3 are determined to receive a reward (e.g. the top 30% of all players (individual and team), across all companies, will win an e-gift card). At the end of the quarter, a top scoring fraction (e.g. the top 20%) of all players (predetermined qualifier), across all companies, will advance to the third quarter, "League Play" (see below). Further, at the end of the quarter, a top scoring fraction (e.g. the top two users), across all companies, may win an additional prize each (e.g. a cash prize). Further, at the end of the second quarter, a top scoring fraction (e.g. the top 50%) of all teams may win e-gift card each.

Optionally, during the second to fourth quarter, if a user drops from a group, a wildcard may be awarded randomly to a top scoring fraction (e.g. the top 5%) of users 3 in individual play, to complete the group.

In the beginning of the third quarter (3 months, e.g. July to September) again the user's scores/points are reset to zero. For the league play users, the question difficulty is increased, e.g. set to "High". The users 3 meeting the above predetermined qualifier are assigned to groups. The league play users 3 are placed in random groups within the same division across all companies. During the third quarter, the points for each correct answer given are increased (e.g. set to 8 points). At the end of a game segment (i.e. the week), the user 3 can win another predetermined amount of points (e.g. 20 points), if the user 3 wins the game segment. On a regular (e.g. a monthly) basis, those users 3 are determined to receive a reward (e.g. the top 30% of all players (individual and team), across all companies, will win an e-gift card). At the end of the quarter, a top scoring fraction (e.g. the top 10%) of all players (predetermined qualifier), across all companies, will advance to the fourth quarter, "Championship Play" (see below). Further, at the end of the quarter, a top scoring fraction (e.g. the top two users), across all companies, may win an additional prize each (e.g. a cash prize). Further, at the end of the third quarter, a top scoring fraction (e.g. the top 30%) of all teams may win e-gift card each.

In the beginning of the fourth quarter (3 months, e.g. October to December) again the user's scores/points are reset to zero. For the championship users, the question difficulty is increased, e.g. set to "Championship High". The users 3 meeting the above predetermined qualifier are assigned to groups. The championship users 3 are placed in random groups across all companies. During the fourth quarter, the points for each correct answer given is increased (e.g. set to 10 points). At the end of a game segment (i.e. the week), the user 3 can win another predetermined amount of points (e.g. 25 points), if the user 3 wins the game segment. Only during the fourth quarter, all groups will automatically be able to access the full range play of "Black Jack", i.e.

"double down", "split", etc. On a regular (e.g. a monthly) basis, those users 3 are determined to receive a reward (e.g. the top 30% of all players (individual and team), across all companies, will win an e-gift card). Further, at the end of the quarter, a top scoring fraction (e.g. the top two users), across all companies, may win an additional prize each (e.g. a cash prize). Further, at the end of the third quarter, a top scoring fraction (e.g. the top 20%) of all teams may win e-gift card each.

Figure 8:
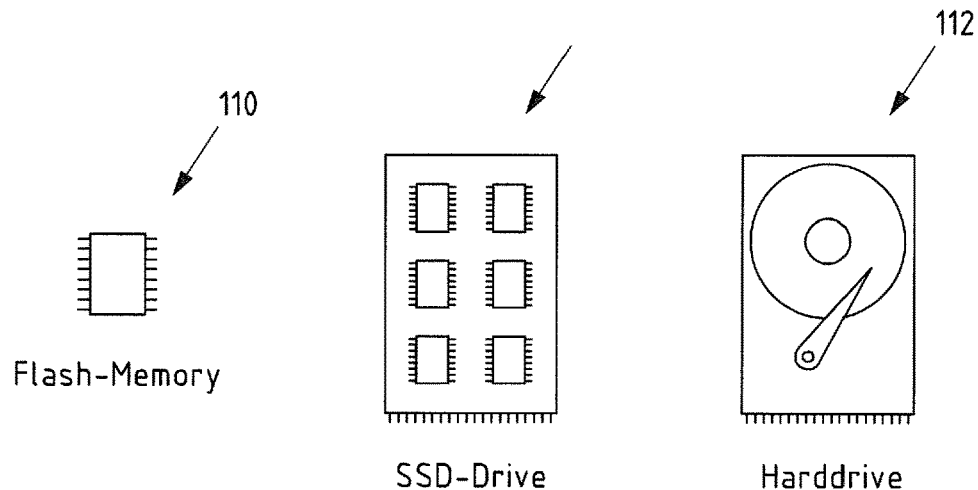
FIG. 8 a schematic illustration of examples of tangible storage media according to the present invention.
Figure 8:
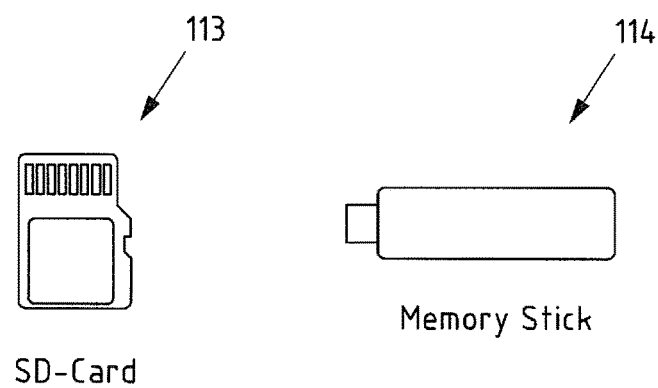
Figure 8:
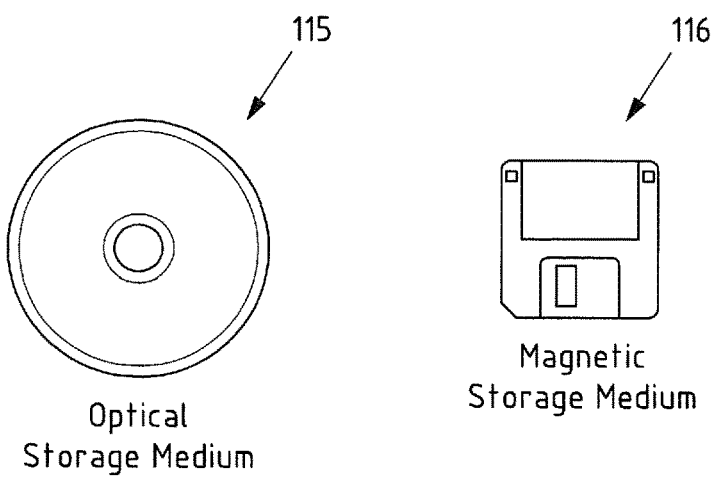

FIG. 8 illustrates examples of tangible storage media that may for instance be used to implement program memory 21 of FIG. 2. To this end, FIG. 8 displays a flash memory 110, which may for instance be soldered or bonded to a printed circuit board, a solid-state drive 111 comprising a plurality of memory chips (e.g. Flash memory chips), a magnetic hard drive 112, a Secure Digital (SD) card 113, a Universal Serial Bus (USB) memory stick 114, an optical storage medium 115 (such as for instance a CD-ROM or DVD) and a magnetic storage medium 116.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processor 20 of FIG. 2, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices and methods within the spirit and scope of the invention.

The invention claimed is:

1. A method for educating a user of a client apparatus by gamification, said method performed by a server apparatus and comprising:
repeatedly generating random timing data defining a time at which a graphical user interface element to be produced by the client apparatus appears;
associating said random timing data with a specific user profile from among a plurality of user profiles stored in a database;
in response to a user logging into the specific profile on the client apparatus, receiving a request from the client apparatus for said random timing data associated with the specific user profile;
in response to the request, providing said random timing data to the client apparatus so as to cause the graphical user interface element to appear at the time defined by the random timing data, said graphical user interface element allowing a user of the client apparatus, using a first software section or a user interface thereof, upon activation of said graphical user interface element to access a second software section or a user interface thereof for educating the user by gamification; and
marking the generated random timing data as used, if it is determined that said user has activated said graphical user interface element.

2. The method according to claim 1, wherein the first software section provides a work environment to said user.

3. The method according to claim 2, wherein at least one of the first software section and the second software section is or is part of a web application.

4. The method according to claim 1, wherein said random timing data is generated periodically.

5. The method according to claim 1, wherein said random timing data is generated to be within a predetermined range.

6. The method according to claim 1, wherein said random timing data is only generated and/or provided during a predetermined time period representing a game segment.

7. The method according to claim 1, wherein said method further comprises
determining whether said graphical user interface element has been activated by said user.

8. The method according to claim 1, wherein said method further comprises
providing education data associated with said second software section for testing said user with a test, if it is determined that said user has activated said graphical user interface element.

9. The method according to claim 8, wherein said method further comprises performing an action related to a game associated with said second software section when a user has passed said test based on said education data associated with said second software section.

10. The method according to claim 9, wherein said performing of said game related action comprises generating, storing, updating and/or providing game data associated with said game associated with said second software section.

11. The method according to claim 9, wherein said method further comprises
increasing a score associated with said user if it is determined that said user has achieved a predetermined aim in said game.

12. The method according to claim 9, wherein said method further comprises
providing or triggering providing additional game related options to said user in dependence of the state of the game.

13. The method according to claim 8, wherein said method further comprises
testing or triggering testing said user based on said education data associated with said second software section.

14. The method according to claim 8, wherein said education data associated with said second software section for testing said user comprises at least a question to be answered by the user and possible answers to said question.

15. The method according to claim 14, wherein said method further comprises
displaying or triggering displaying to said user said question to be answered by the user and said possible answers.

16. The method according to claim 14, wherein said method further comprises
accepting a correct answer to said question given by said user, only if it was given within a predetermined time limit.

17. The method according to claim 8, wherein said method further comprises
increasing a score associated with said user, if it is determined that said user has passed said test.

18. The method according to claim 8, wherein said education data associated with said second software section for testing said user is related to said user's profession, working environment and/or employment.

19. The method according to claim 1, wherein said method further comprises
exiting or triggering exiting said second software section or said user interface thereof and returning to said first software section or said user interface thereof.

20. The method according to claim 1, wherein said method is performed for a plurality of users.

21. The method according to claim 20, wherein said method further comprises
determining, among the plurality of users, users meeting a predetermined qualifier; and
assigning said users meeting said predetermined qualifier to groups.

22. The method according to claim 21, wherein said predetermined qualifier requires a user to be among a top scoring fraction of users.

23. The method according to claim 21, wherein said determining of users meeting said predetermined qualifier and said assigning of said users meeting said predetermined qualifier to groups is performed periodically.

24. The method according to claim 20, wherein said method further comprises
regularly determining users to receive a reward; and
providing information associated with respective rewards to respective users.

25. The method according to claim 24, wherein said determining of users to receive a reward comprises determining users of a top scoring fraction of users.

26. A method for educating a user of a client apparatus by gamification, said method performed by a server apparatus and comprising:
repeatedly generating random position data representative of a display position of a graphical user interface element to be produced by the client apparatus;
associating said random position data with a specific user profile from among a plurality of user profiles stored in a database;
in response to a user logging into the specific profile on the client apparatus, receiving a request from the client apparatus for said random position data associated with the specific user profile;
in response to the request, providing said random position data to the client apparatus so as to cause the graphical user interface element to appear at the display position represented by the random position data, said graphical user interface element allowing a user of the client apparatus, using a first software section or a user interface thereof, upon activation of said graphical user interface element to access a second software section or a user interface thereof for educating the user by gamification; and
marking the generated random position data as used, if it is determined that said user has activated said graphical user interface element.

27. A method for educating a user of a client apparatus by gamification, said method performed by the client apparatus and comprising:
in response to a user logging into a specific user profile on the client apparatus, repeatedly checking whether random timing data associated with the specific user profile has been generated by a server apparatus, the random timing data defining a time at which a graphical user interface element to be produced by the client apparatus appears;
receiving said generated random timing data from the server apparatus, the random timing data generated by the server apparatus and associated with the specific user profile from among a plurality of user profiles stored in a database;
displaying said graphical user interface element to said user at the time defined by the random timing data, said graphical user interface element allowing a user of the client apparatus, using a first software section or a user interface thereof, upon activation of said graphical user interface element to access a second software section or a user interface thereof for educating the user by gamification; and
providing a notification to the server apparatus that said graphical user interface element has been activated, wherein the server apparatus marks the generated random timing data as used in response to the notification.

28. A system comprising:
a server apparatus configured to repeatedly generate random timing data defining a time at which a graphical user interface element appears and associate said random timing data with a specific user profile from among a plurality of user profiles stored in a database; and a client apparatus configured to repeatedly check, in response to a user logging into the specific user profile on the client apparatus, whether said random timing data associated with the specific user profile has been generated by the server apparatus, receive said generated random timing data from the server apparatus, and display said graphical user interface element to said user at the time defined by the random timing data, said graphical user interface element allowing a user of the client apparatus, using a first software section or a user interface thereof, upon activation of said graphical user interface element to access a second software section or a user interface thereof for educating the user by gamification, wherein the server apparatus marks the generated random timing data as used, if it is determined that said user has activated said graphical user interface element.

29. A method for educating a user of a client apparatus by gamification, said method performed by the client apparatus and comprising:

in response to a user logging into a specific user profile on the client apparatus, repeatedly checking whether random position data associated with the specific user profile has been generated by a server apparatus, the random position data representative of a display position of a graphical user interface element to be produced by the client apparatus;

receiving said generated random position data from the server apparatus, the random position data generated by the server apparatus and associated with the specific user profile from among a plurality of user profiles stored in a database;

displaying said graphical user interface element to said user at the display position represented by the random position data, said graphical user interface element allowing a user of the client apparatus, using a first software section or a user interface thereof, upon activation of said graphical user interface element to access a second software section or a user interface thereof for educating the user by gamification; and providing a notification to the server apparatus that said graphical user interface element has been activated, wherein the server apparatus marks the generated random position data as used in response to the notification.

30. A system comprising:

a server apparatus configured to repeatedly generate random position data representative of a display position of a graphical user interface element and associate said random position data with a specific user profile from among a plurality of user profiles stored in a database; and a client apparatus configured to repeatedly check, in response to a user logging into the specific user profile on the client apparatus, whether said random position data associated with the specific user profile has been generated by the server apparatus, receive said generated random position data from the server apparatus, and display said graphical user interface element to said user at the position represented by the random position data, said graphical user interface element allowing a user of the client apparatus, using a first software section or a user interface thereof, upon activation of said graphical user interface element to access a second software section or a user interface thereof for educating the user by gamification, wherein the server apparatus marks the generated random position data as used, if it is determined that said user has activated said graphical user interface element.

* * * * *